(12) United States Patent
Smith et al.

(10) Patent No.: US 8,617,325 B2
(45) Date of Patent: *Dec. 31, 2013

(54) ACTIVELY DAMPED TENSION MEMBER

(75) Inventors: Rory S. Smith, Dubai (AE); Stefan Kaczmarczyk, Northampton (GB)

(73) Assignee: ThyssenKrupp Elevator Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/343,030

(22) Filed: Jan. 4, 2012

(65) Prior Publication Data

US 2012/0175025 A1  Jul. 12, 2012

Related U.S. Application Data

(63) Continuation of application No. 12/122,248, filed on May 16, 2008, now Pat. No. 8,110,050.

(60) Provisional application No. 60/938,305, filed on May 16, 2007.

(51) Int. Cl.
*B66B 7/06* (2006.01)
*C22F 1/10* (2006.01)

(52) U.S. Cl.
USPC .......... 148/563; 148/402; 187/251; 187/407

(58) Field of Classification Search
None
See application file for complete search history.

(56) References Cited

U.S. PATENT DOCUMENTS

| | | | | |
|---|---|---|---|---|
| 4,018,308 | A * | 4/1977 | Rogen | 187/251 |
| 4,945,727 | A * | 8/1990 | Whitehead et al. | 60/527 |
| 6,024,347 | A * | 2/2000 | Grosskrueger et al. | 267/220 |
| 6,170,202 | B1 * | 1/2001 | Davoodi et al. | 52/167.1 |
| 8,110,050 | B2 * | 2/2012 | Smith et al. | 148/510 |
| 2005/0199455 | A1 * | 9/2005 | Browne et al. | 188/266.4 |
| 2006/0000211 | A1 * | 1/2006 | Webster | 60/527 |

* cited by examiner

*Primary Examiner* — George Wyszomierski
(74) *Attorney, Agent, or Firm* — Frost Brown Todd LLC

(57) ABSTRACT

A system and method for actively damping tension members modulates the natural frequency of shape memory alloys incorporated into tension members, such as suspension ropes or cables. The frequency of the tension member can be modulated by heating the shape memory alloy, such modulation preventing potentially destructive resonance with natural exciting forces.

21 Claims, 6 Drawing Sheets

ACTIVELY DAMPED TENSION MEMBER

PRIORITY

This application is a continuation of U.S. Nonprovisional patent application Ser. No. 12/122,248, entitled "Actively Damped Tension Member," filed May 16, 2008, now U.S. Pat. No. 8,110,050, which is herein incorporated by reference in its entirety. This application claims priority from the disclosure of U.S. Provisional Patent Application Ser. No. 60/938,305, entitled "Actively Damped Tension Member," filed May 16, 2007, which is herein incorporated by reference in its entirety.

FIELD

The present invention relates, in general, to damping oscillations in tension members and, in particular, to damping oscillations in tension members using shape memory alloys.

BACKGROUND

Tension members such as ropes and cables are subject to oscillations. These members can be excited by external forces such as wind. If the frequency of exciting forces matches the natural frequency of the tension member, then the tension member will resonate.

At the former World Trade Center in New York, high velocity winds caused the building to sway back and forth. The frequency of the building sway matched the natural frequency of the elevator compensating and they went into resonance. In resonance the amplitude of the oscillations increases unless limited by some form of dampening. At the World Trade Center, the oscillating compensation cables collided with entrance doors and shaft walls destroying both. Catastrophic resonance has also occurred causing bridges to collapse. Damping mechanisms are required to control resonance.

BRIEF DESCRIPTION OF THE DRAWINGS

The accompanying drawings incorporated in and forming a part of the specification illustrate several aspects of the present invention, and together with the description serve to explain the principles of the invention; it being understood, however, that this invention is not limited to the precise arrangements shown. In the drawings, like reference numerals refer to like elements in the several views. In the drawings.

DETAILED DESCRIPTION

A shape memory alloy (SMA) is an alloy that "remembers" its shape. SMAs are compositions that exhibit the austenite phase, the martensite phase, and a mixture of both. The three main types of SMA are copper-zinc-aluminum-nickel, copper-aluminum-nickel, and nickel-titanium (NiTi) alloys. The SMA elements demonstrate the shape memory effect. They can be subjected to large deformations in low temperatures (in the martensite phase) and when heated to a higher temperature they will return to their original shape prior to the deformation.

Figure 1:
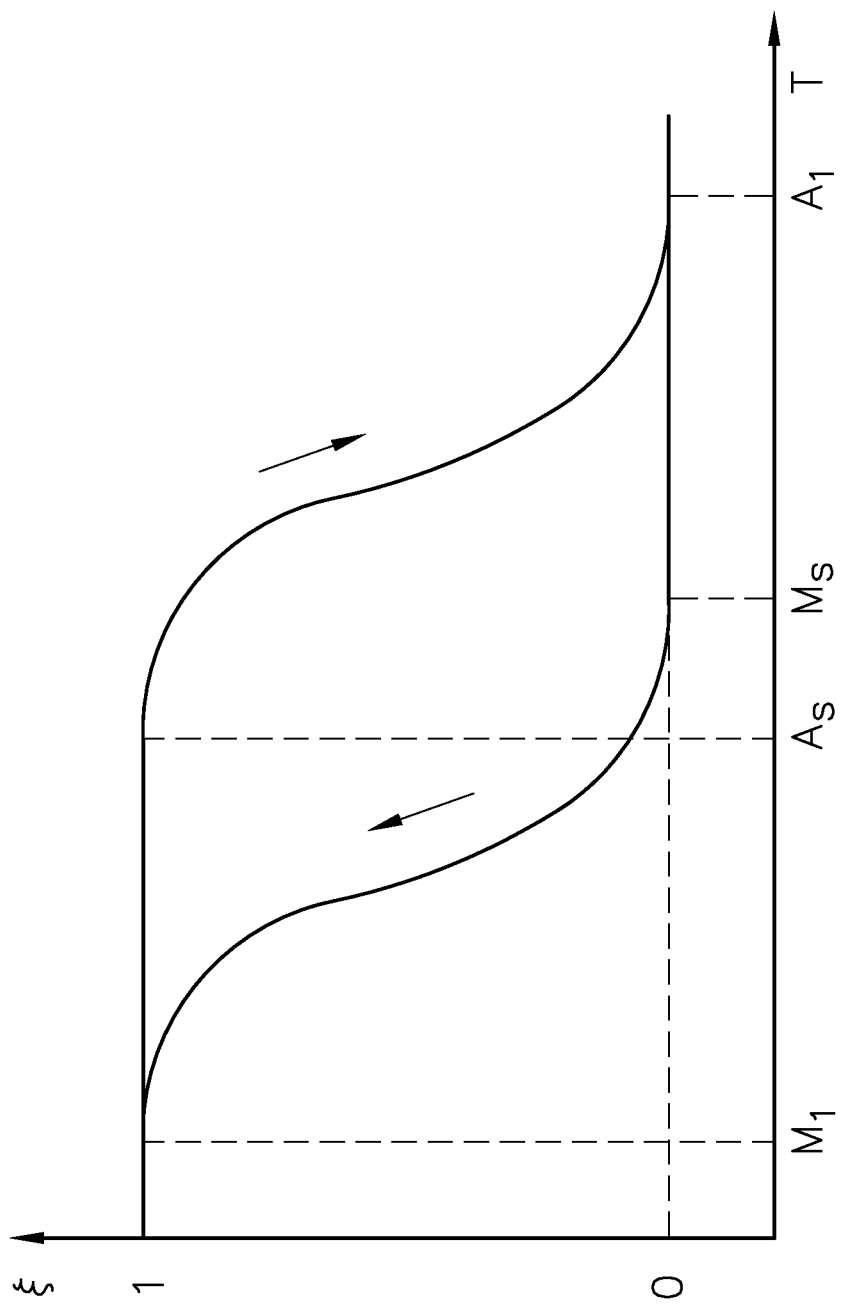
FIG. 1 illustrates a graphical representation of the martensite fraction.

In the martensite phase, the SMA element is soft and easily deformable. The amount of martensitic material that is present in the martensite phase is represented by the martensite fraction which can vary from 0 to 1. This fraction is plotted as a function of temperature in FIG. 1. Upon heating an SMA material in the martensite phase, the temperature at which the material starts transforming from martensite to austenite is referred to as the austenite start temperature (As), while the temperature at which it is fully transformed to the austenite form is called the austenite finish temperature (Af). Upon cooling an SMA material in the austenite phase, first the martensite start temperature (Ms) is reached and the phase transformation begins. In the martensite finish temperature (MO the material is back in the martensite form.

In the austenite phase, an SMA element has a high modulus of elasticity. When it is cooled, the martensite phase takes place where it has a low elastic modulus. Thus, the stiffness of the SMA element in the austenite phase is increased affecting its natural frequency. (Mf) is the temperature at which the transition is finished. Accordingly, (As) and (Af) are the temperatures at which the reverse transformation from that repeated use of the shape memory effect may lead to a shift of the characteristic transformation temperatures (this effect is known as functional fatigue, as it is closely related with a change of microstructural and functional properties of the material).

The transition from the martensite phase to the austenite phase is only dependent on temperature and stress, not time, as most phase changes are, as there is no diffusion involved. It is the reversible diffusionless transition between these two phases that allow the special properties to arise.

The SMA elements are known for their pseudoelastic or superelastic behavior during loading-unloading cycles which is demonstrated by their stress-strain response at the temperature above the transformation (Af). This behavior is responsible for an increased structural damping capacity when the element undergoes very large dynamic displacements.

The fundamental frequency (also called a natural frequency) of a periodic signal is the inverse of the pitch period length. The pitch period is, in turn, the smallest repeating unit of a signal. The significance of defining the pitch period as the smallest repeating unit can be appreciated by noting that two or more concatenated pitch periods form a repeating pattern in the signal. In mechanical applications a tension member, such as a suspension rope, fixed at one end and having a mass attached to the other, is a single degree of freedom oscillator. Once set into motion, it will oscillate at its natural frequency. For a single degree of freedom oscillator, a system in which the motion can be described by a single coordinate, the natural frequency depends on two system properties; mass and stiffness. Damping is any effect, either deliberately engendered or inherent to a system, that tends to reduce the amplitude of oscillations of an oscillatory system.

Figure 2:
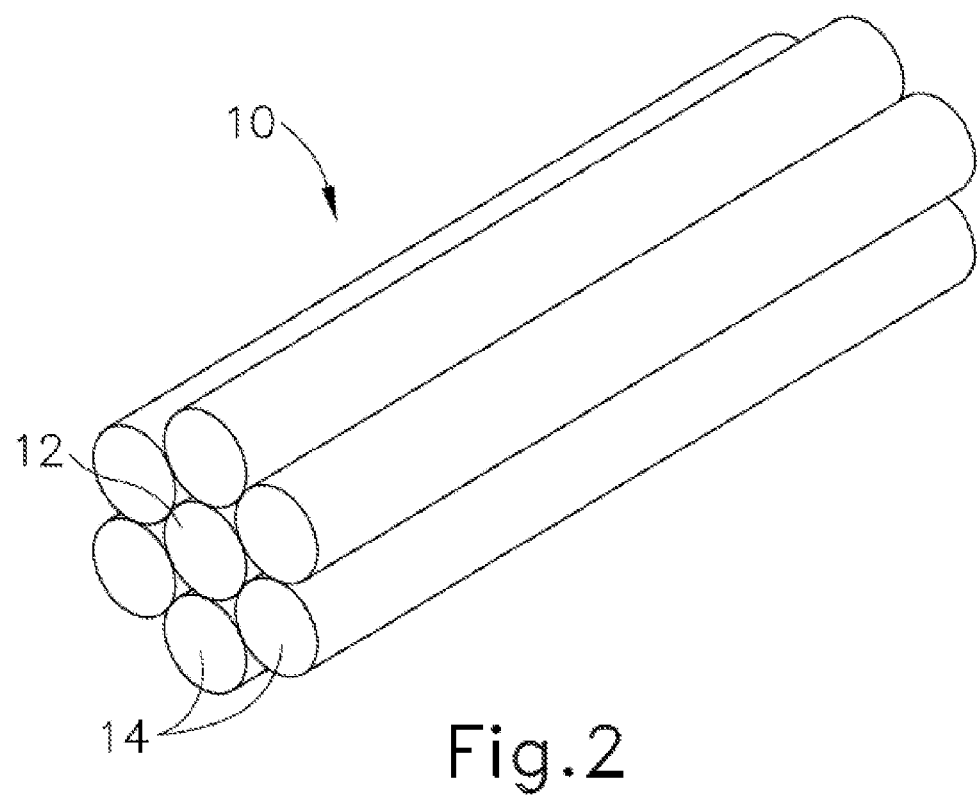
FIG. 2 is a perspective view of a portion of a tension member having a shape memory alloy core surrounded by aramid strands.

Referring to FIG. 2, a tension member (10) is shown having a core (12) and strands (14) surrounding the core. In one version, the core (12) is comprised of a SMA and the strands (14) surrounding the core are configured from an aramid material. By incorporating SMA material as part of a tension member in, for example, an elevator or bridge's suspension cables, the SMA's damping capacity and its ability to change its natural frequency will affect the natural frequency of the tension member. Thus, by selectively changing the natural frequency of the tension member, the tension member can be prevented from reaching resonance conditions. Furthermore, the shape recovery capabilities of the SMA element can be used to control stability of the tension member.

Figure 3:
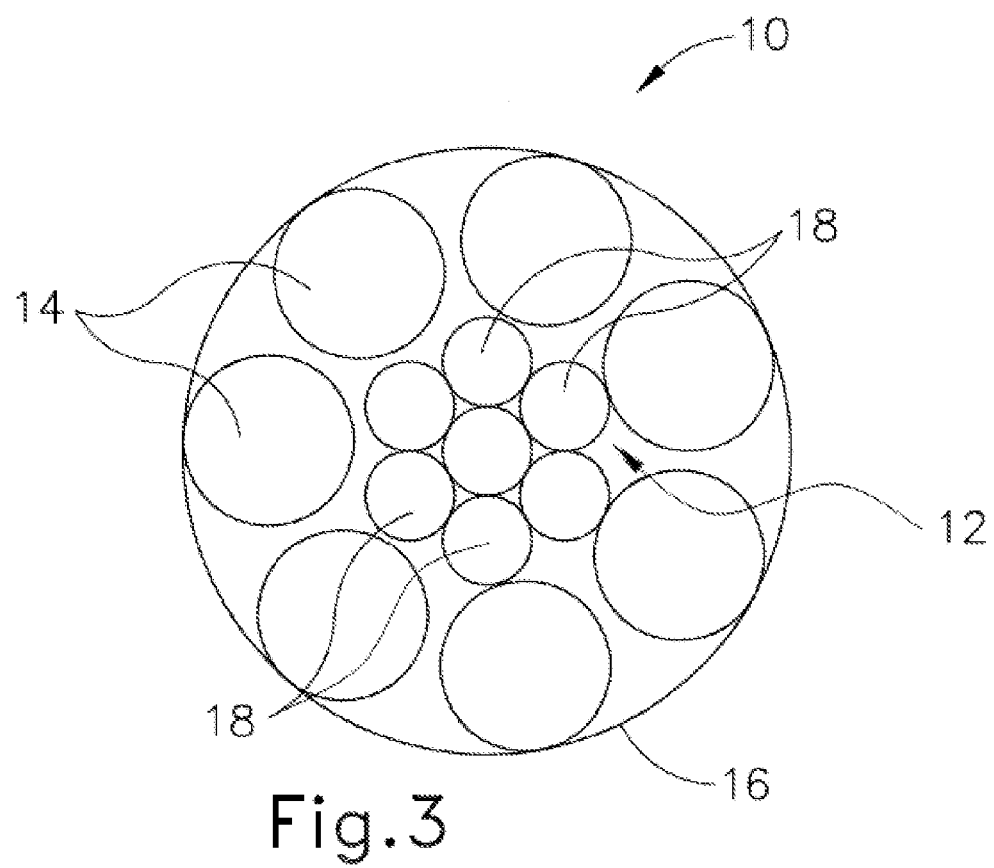
FIG. 3 is a cross-sectional view of one version of the tension member shown in FIG. 2.
Figure 4:
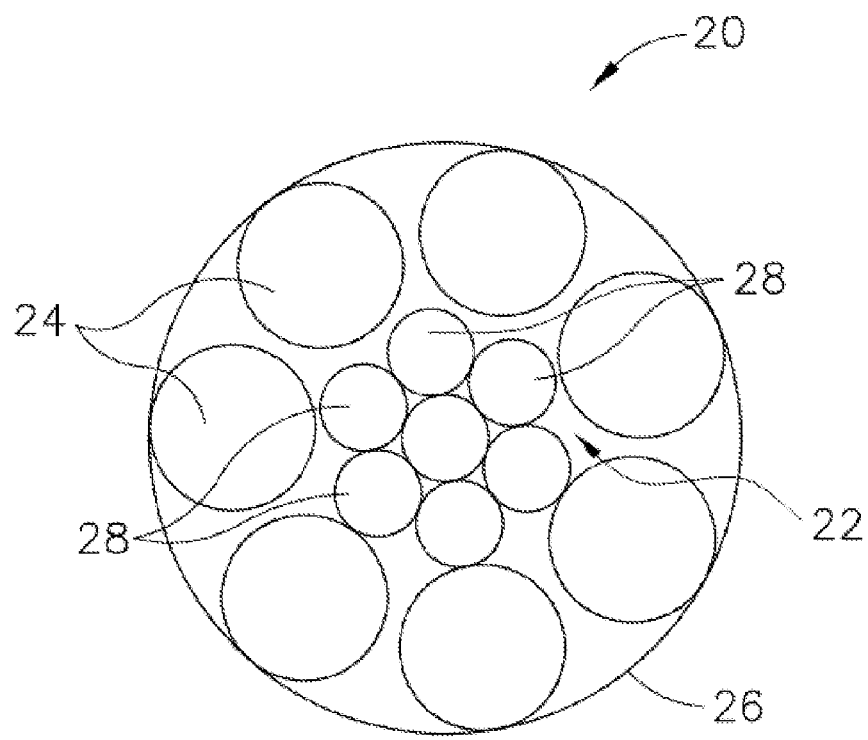
FIG. 4 is a cross-sectional view of an alternative version of the tension member shown in FIG. 2.

FIG. 3 illustrates one version of a cross-sectional view of the tension member (10) of FIG. 2. In the illustrated version, the tension member (10) includes a core (12) comprising a plurality of SMA strands (18) and outer strands (14). The strands (18) and (14) are sheathed within a jacket (16). In one version, the core (12) comprises a bundle of wire made from SMA that are made into the central strand of the rope or tension member (10). The SMA wires may be twisted at various helix angles, or they may simply be aligned in a parallel fashion. If twisted at the proper helix angle so they elongate in unison with the balance of the rope, then the SMA elements can also be load bearing elements. If not twisted in such a manner, then the SMA wires will not be load bearing. The balance of the rope, such as the strands (14), may be made of metals such as steel and/or synthetic fibers such as aramid. FIG. 4 illustrates an alternative version of a tension member (20) shown in cross-section, where a core (22) includes a plurality of strands (28) surrounded by a plurality of SMA strands (24) sheathed within a jacket (26).

Figure 5:
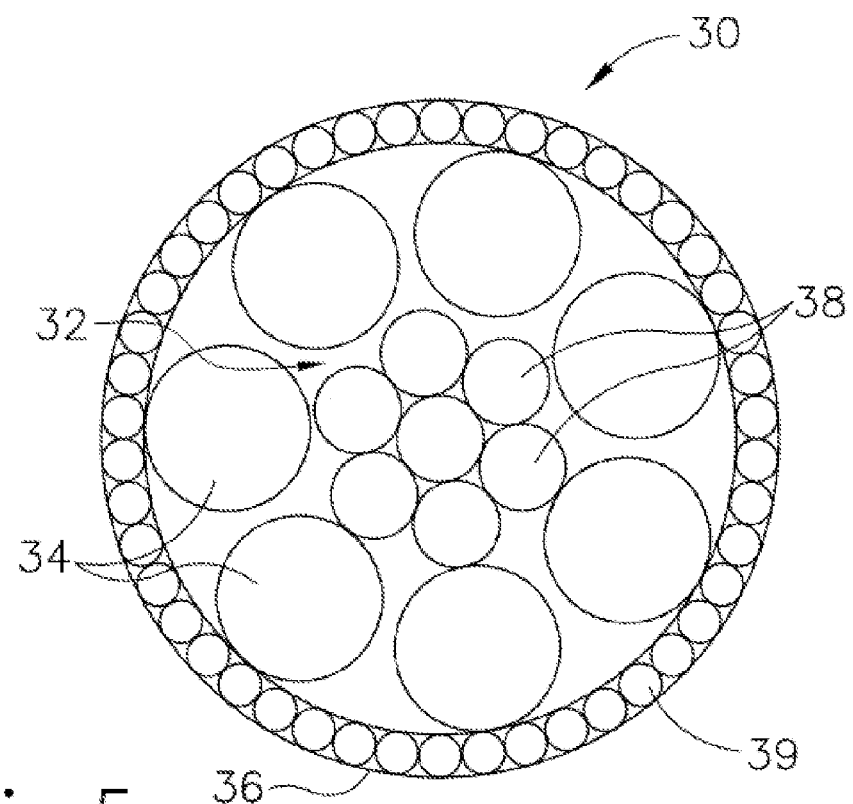
FIG. 5 is a cross-sectional view of an alterative version of the tension member shown in FIG. 2 having a jacket.

FIG. 5 illustrates an alternative version of a tension member (30) shown in cross-section having a core (32) with a plurality of strands (38) surrounded by a plurality of strands (34). The strands (38) and (34), which may include any combination of SMA and non-SMA material, are sheathed within a jacket (36) that is braided with SMA wire (39).

Figure 6:
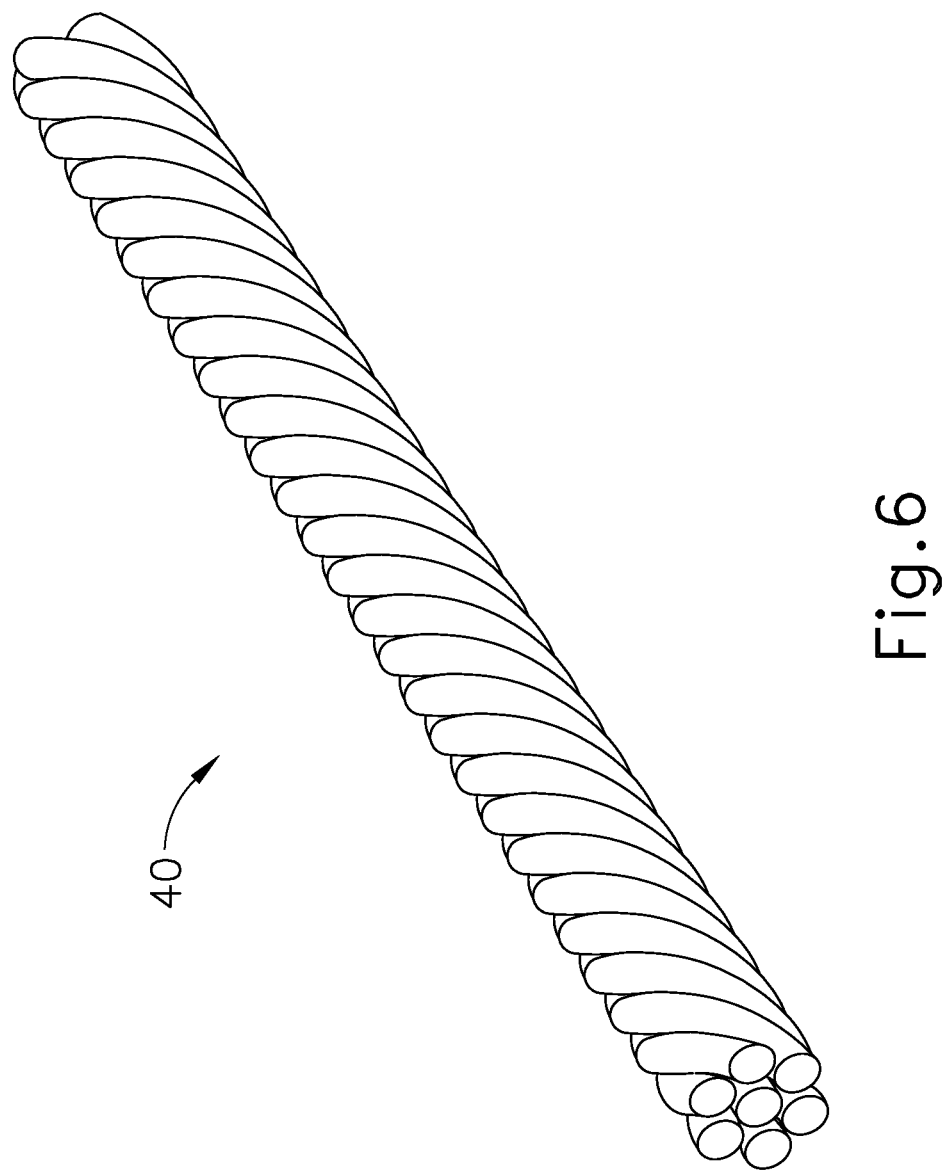
FIG. 6 is a perspective view of an alternate version of a tension member having a twisted configuration.

It will be appreciated that the tension members (10), (20), (30) illustrated in FIGS. 2-5 are described by way of example only, where any suitable strand, cable, jacket, fiber, and/or braiding arrangement may be used in any suitable tension member, cable, rope, or suspension member in accordance with versions described herein. Any suitable configuration of SMA and non-SMA strands may be provided to take advantage of the phase-changing properties of the SMA material to damp oscillations and prevent resonance. FIG. 6 illustrates an alternative version of a tension member (40) having a twisted configuration. It will be appreciated that tension members incorporating versions of the system and methods described herein may have any suitable configuration, such as a parallel, twisted, braided, and/or compound configuration.

Induction heating is the process of heating an electrically conducting object, such as a SMA, by electromagnetic induction, where eddy currents are generated within the metal and resistance leads to Joule heating of the metal. An induction heater generally includes an electromagnet, through which a high-frequency alternating current is passed. The frequency of AC used depends on the object size, material type, coupling (between the induction coil and the object to be heated), and the penetration depth. It will be appreciated that any suitable configuration accounting for such variables is contemplated.

Figure 7:
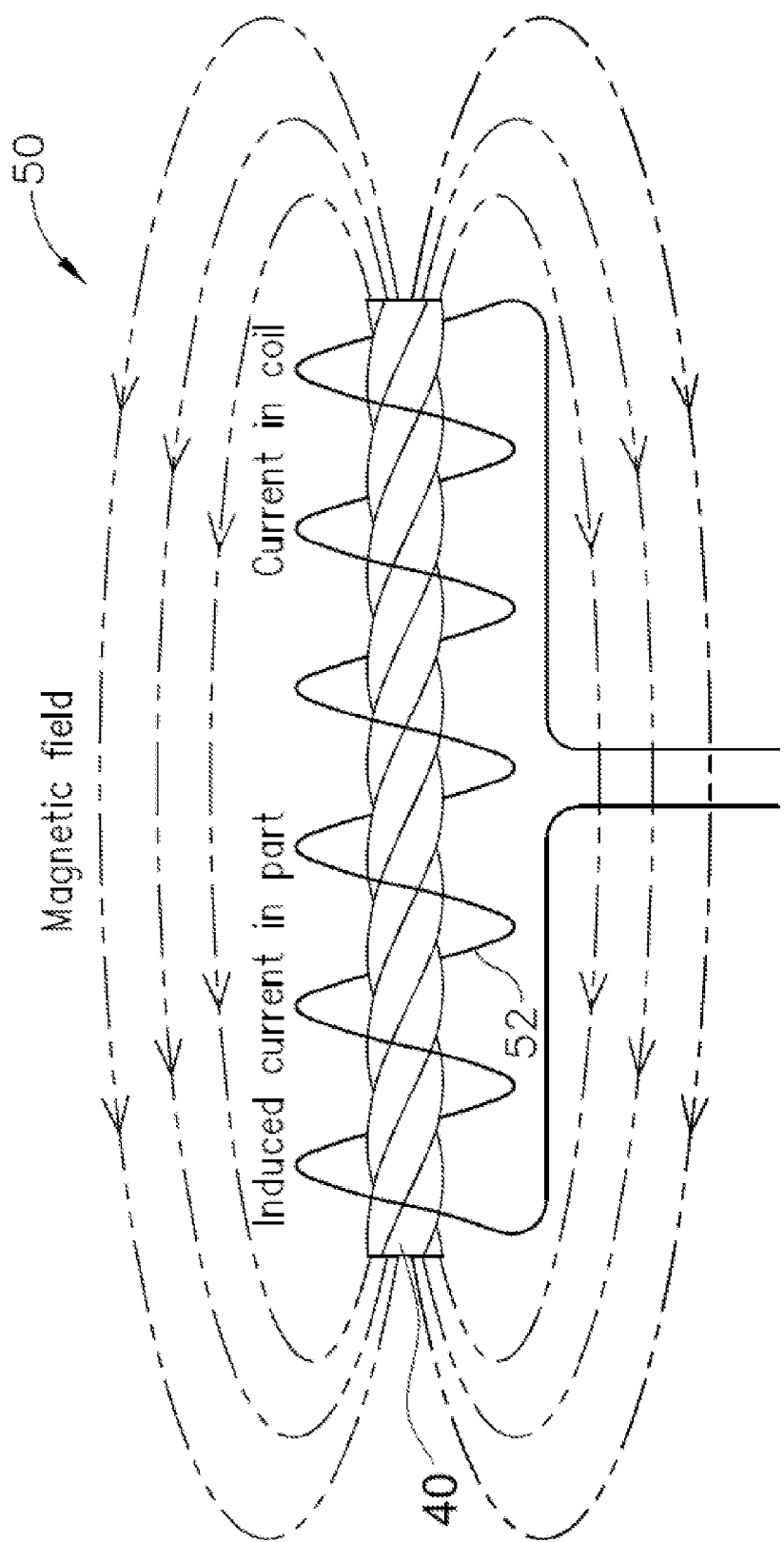
FIG. 7 is a schematic view of one version of an inductive coupling between an induction coil and a tension member.

Referring to FIG. 7, the phase change properties of the SMA material within a tension member (40) are, in one version, modulated with induction heating via an inductive coupling (50) to selectively alter the natural frequency of the tension member (40). As described, if the frequency of exciting forces, such as wind or the sway of a building, match the natural frequency of a tension member, then the tension member will resonate to potentially destructive effect. In one version, as exciting forces and the natural frequency of the tension member (40) approach resonance, inductive heating may be used to alter the natural frequency of the tension member such that the frequencies of the tension member and the exciting forces do not match, thereby preventing resonance. Any suitable sensing or calculation means may be used to determine the frequency of exciting forces. It will be appreciated that the thermal change needed to induce a phase change in SMA can be created by any suitable means. Any phase change inducer, thermal or non-thermal, may be provided to facilitate active damping of a tension member.

In one version, the inductive coupling (50) includes an induction coil (52), coupled to an AC power source, coiled as a solenoid about a tension member (40) comprised at least in part of SMA. When current is applied to the induction coil (52) a magnetic field is generated that induces current within the SMA material of the tension member (40) and inductively heats the SMA. As described with reference to FIG. 1, when the SMA is heated a phase change is induced that alters the stiffness and the corresponding natural frequency of the SMA. The phase change may be modulated, for example, by a PID controller that monitors exciting forces and correspondingly controls the state of the SMA to prevent resonance. Modulating the phase change in the disclosed manner allows for the tension member (40) to be actively damped.

Figure 8:
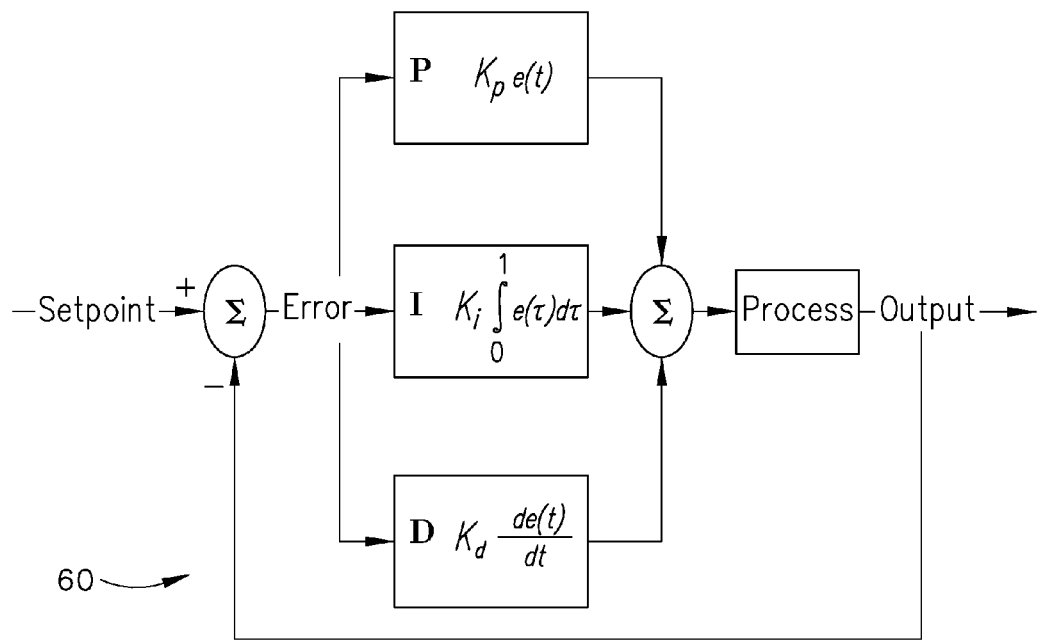
FIG. 8 is a schematic view of one version of a PID controller for operating the system.

FIG. 8 illustrates a schematic of one version of a proportional—integral—derivative controller or "PID controller" (60) that may be used to actively dampen a tension member. The PID controller (60) may be implemented in software in programmable logic controllers (PLCs) or as a panel-mounted digital controller. Alternatively, the PID controller (60) may be an electronic analog controller made from a solid-state or tube amplifier, a capacitor, and a resistance. It will be appreciated that any suitable controller may be incorporated, where versions may use only one or two modes to provide the appropriate system control. This may be achieved, for example, by setting the gain of undesired control outputs to zero to create a PI, PD, P, or I controller.

It will be appreciated that any suitable modifications to the PID controller (60) may be made including, for example, providing a PID loop with an output deadband to reduce the frequency of activation of the output. In this manner the PID controller (60) will hold its output steady if the change would be small such that it is within the defined deadband range. Such a deadband range may be particularly effective for an actively damping tension member where a precise setpoint is not required. The PID controller (60) can be further modified or enhanced through methods such as PID gain scheduling or fuzzy logic.

Figure 9:
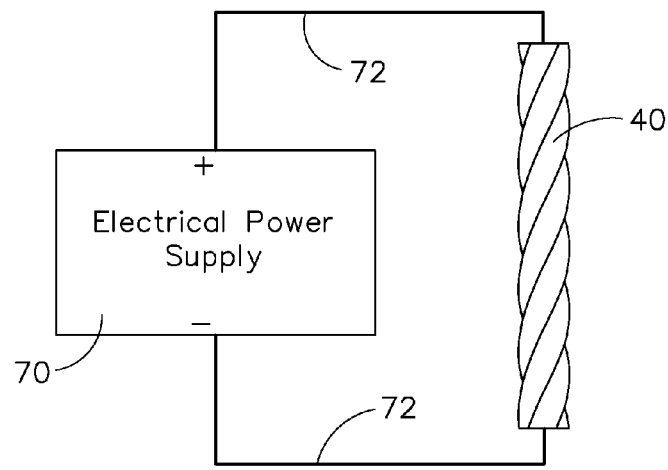
FIG. 9 is a schematic view of one version of a resistance heating configuration to initiate a phase change in a tension member.

FIG. 9 illustrates one version of a system for initiating a phase change in a tension member (40) using resistance heating. For example, aramid is an electrical insulator and SMA is an electrical conductor. If electrical current, either AC or DC, is connected to the SMA at the rope terminations, the entire length of the SMA will be heated. In the illustrated version an electrical power supply (70) is coupled via leads (72) to the ends of the tension member (40). Resistance heating may be controlled or modulated in any suitable manner such as, for example, with a PID controller. Convection or forced convection may also be used to initiate a thermal phase change in a tension member.

The versions presented in this disclosure are examples. Those skilled in the art can develop modifications and variants that do not depart from the spirit and scope of the disclosed cavitation devices and methods. Thus, the scope of the invention should be determined by appended claims and their legal equivalents, rather than by the examples given.

We claim:

1. A tension member for use with an elevator car, the tension member comprising:
   (a) a first region, wherein at least a portion of the first region comprises a shape memory alloy configured to exhibit a phase change, wherein the phase change provides a change in the stiffness of the first region;
   (b) a second region, wherein at least a portion of the second region comprises load bearing material, wherein the load bearing material is configured to support the weight of the elevator;
   (c) an elongated body having first and second ends, wherein the load bearing material of the second region and the shape memory alloy of the first region are positioned along the elongated body of the tension member, wherein the tension member is configured to suspend the elevator car from a select one of the first and second ends; and
   (d) a core, wherein the shape memory alloy is retained with the core.

2. The device of claim 1, where the core of the tension member is at least partially surrounded by aramid fibers.

3. The device of claim 1, wherein the core is twisted.

4. The device of claim 3, wherein the elongation of the core matches the elongation of the surrounding material.

5. The device of claim 1, wherein the core comprises non-twisted strands of shape memory alloy, and is substantially non-load bearing.

6. The device of claim 1, wherein an inducer is configured to initiate the phase change in the shape memory alloy, wherein the phase change is caused by a select one of induction heating and resistive heating.

7. The device of claim 6, wherein a controller is configured to control the inducer to modulate the phase change of the shape memory alloy.

8. The device of claim 1, wherein the tension member is a suspension cable for the elevator.

9. The device of claim 1, wherein substantially all of the load bearing function is provided by the second region.

10. A tension member for use with an elevator car, the tension member comprising:
    (a) a first region, wherein at least a portion of the first region, comprises a shape memory alloy configured to exhibit a phase change, wherein the phase change provides a change in the stiffness of the first region;
    (b) a second region, wherein at least a portion of the second region comprises load bearing material, wherein the load bearing material is configured to support the weight of the elevator;
    (c) an elongated body having first and second ends, wherein the load bearing material of the second region and the shape memory alloy of the first region are positioned along the elongated body of the tension member, wherein the tension member is configured to suspend the elevator car from a select one of the first and second ends; and
    (d) a core, wherein the shape memory alloy is retained outside of the core.

11. The device of claim 10, wherein the tension member comprises an outer jacket surrounding the core of the tension member, wherein the shape memory alloy is retained within the outer jacket.

12. The device of claim 11, wherein the outer jacket comprises braided strands of shape memory alloy.

13. The device of claim 10, wherein an inducer is configured to initiate the phase change in the shape memory alloy, wherein the phase change is caused by a select one of induction heating and resistive heating.

14. The device of claim 13, wherein a controller is configured to control the inducer to modulate the phase change of the shape memory alloy.

15. The device of claim 10, wherein the tension member is a suspension cable for the elevator.

16. The device of claim 10, wherein substantially all of the load bearing function is provided by the second region.

17. A method for actively damping a tension member comprising the steps of:
    (a) suspending an elevator car using a tension member, wherein the tension member comprises at least a portion of shape memory alloy configured to exhibit a phase change, wherein the at least a portion of shape memory alloy is retained within a core of the tension member, wherein the core of the tension member is at least partially surrounded by aramid fibers;
    (b) inducing a phase change in the shape memory alloy;
    (c) modulating the phase change of the shape memory alloy to alter the natural frequency of the tension member;
    (d) calculating the frequency of exciting forces;
    (e) calculating the natural frequency of the tension member; and
    (f) controlling modulation of the phase change of the shape memory alloy such that the frequency of the exciting forces does not substantially match the natural frequency of the tension member.

18. The method of claim 17, wherein the core is twisted.

19. The method of claim 18, wherein the elongation of the core matches the elongation of the surrounding material.

20. The method of claim 17, wherein the act of inducing a phase change in the shape memory alloy comprises a select one of induction heating and resistive heating of the shape memory alloy of the tension member.

21. The method of claim 17, wherein the act of controlling modulation of the phase change of the shape memory alloy comprises adjusting the temperature of the shape memory alloy.

* * * * *